US009506450B2

(12) United States Patent  
Kanemoto et al.

(10) Patent No.: US 9,506,450 B2
(45) Date of Patent: Nov. 29, 2016

(54) SUBMERSIBLE POWER GENERATOR

(71) Applicant: KYOWA ENGINEERING CONSULTANTS CO., LTD., Tokyo (JP)

(72) Inventors: Toshiaki Kanemoto, Fukuoka (JP); Isao Samura, Tokyo (JP)

(73) Assignee: KYOWA ENGINEERING CONSULTANTS CO., LTD., Tokyo (JP)

( * ) Notice: Subject to any disclaimer, the term of this patent is extended or adjusted under 35 U.S.C. 154(b) by 0 days.

(21) Appl. No.: 14/421,176

(22) PCT Filed: Oct. 17, 2012

(86) PCT No.: PCT/JP2012/076785
§ 371 (c)(1),
(2) Date: Feb. 12, 2015

(87) PCT Pub. No.: WO2014/061116
PCT Pub. Date: Apr. 24, 2014

(65) Prior Publication Data
US 2015/0240778 A1 Aug. 27, 2015

(51) Int. Cl.
*F03D 9/00* (2016.01)
*F03B 13/10* (2006.01)
(Continued)

(52) U.S. Cl.
CPC .............. *F03B 13/105* (2013.01); *F03B 13/10* (2013.01); *F03B 17/061* (2013.01); *F03D 1/025* (2013.01);
(Continued)

(58) Field of Classification Search
CPC ....................................................... F03D 9/00
(Continued)

(56) References Cited

U.S. PATENT DOCUMENTS 2,501,696 A * 3/1950 Souczek ............... F03B 17/061
290/43
4,219,303 A * 8/1980 Mouton, Jr. .......... F03B 17/061
415/123
(Continued)

FOREIGN PATENT DOCUMENTS

CN 201090357 Y 7/2008
DE 103 38 395 A1 3/2005
(Continued)

OTHER PUBLICATIONS

Written opinion of the International Searching Authority issued in related application PCT/JP2012/075609, completed Dec. 12, 2012 and mailed Dec. 25, 2012.
(Continued)

*Primary Examiner* — Joseph Waks
(74) *Attorney, Agent, or Firm* — Griffin and Szipl PC

(57) ABSTRACT

A submersible power generator with an inner/outer double rotational armatures-type power generation mechanism provided with an outer rotational armature and an inner rotational armature opposing the outer rotational armature and rotatable in a direction opposite of the outer rotational armature, and a pair of propellers disposed coaxially with blades of each of the pairs of propellers twists in opposite directions relative to an extending direction of a central axis of the pair of propellers, and a casing for accommodating and shielding the inner/outer double rotational armatures-type power generation mechanism. The submersible power generator, as installed under water to operate in a current, has a buoyancy F acting thereon that is larger than gravity W acting thereon during operation of the submersible power generator due to gravity acting on the mooring wire, so that F>W+gravity acting on the mooring wire−buoyancy acting on the mooring wire.

18 Claims, 5 Drawing Sheets

(51) Int. Cl.
*F03B 17/06* (2006.01)
*F03D 1/02* (2006.01)
*H02K 16/00* (2006.01)

(52) U.S. Cl.
CPC .. *F05B 2220/7062* (2013.01); *F05B 2240/242* (2013.01); *F05B 2250/311* (2013.01); *H02K 16/005* (2013.01); *Y02E 10/22* (2013.01); *Y02E 10/28* (2013.01); *Y02E 10/725* (2013.01)

(58) Field of Classification Search
USPC .............................................. 290/54; 415/7
See application file for complete search history.

(56) References Cited

U.S. PATENT DOCUMENTS

| | | | |
|---|---|---|---|
| 4,613,279 A | 9/1986 | Corren et al. | |
| 5,931,737 A * | 8/1999 | Aota | F16D 3/76 464/162 |
| 6,806,586 B2 * | 10/2004 | Wobben | F03B 13/264 290/53 |
| 7,102,249 B2 | 9/2006 | Wobben | |
| 7,199,484 B2 * | 4/2007 | Brashears | F03B 13/10 290/42 |
| 8,070,444 B2 * | 12/2011 | Clarke | F03B 3/126 290/44 |
| 8,264,096 B2 * | 9/2012 | Micu | F03D 1/025 290/43 |
| 8,664,790 B2 * | 3/2014 | Cornelius | 290/54 |
| 8,742,612 B1 * | 6/2014 | Robbins | F03D 1/00 290/54 |
| 2005/0023837 A1 | 2/2005 | Wobben | |
| 2005/0173927 A1 * | 8/2005 | Aukon | H02P 9/00 290/43 |
| 2006/0093482 A1 * | 5/2006 | Wacinski | F03D 1/025 416/128 |
| 2006/0125242 A1 | 6/2006 | Fraenkel | |
| 2006/0269362 A1 | 11/2006 | Henriksen | |
| 2007/0007772 A1 | 1/2007 | Brashears | |
| 2010/0230971 A1 * | 9/2010 | Mackie | F03B 17/061 290/54 |
| 2010/0259050 A1 * | 10/2010 | Meller | F03D 1/025 290/55 |
| 2010/0326343 A1 | 12/2010 | Hunt | |
| 2010/0332041 A1 * | 12/2010 | Hunt | B63B 21/50 700/287 |
| 2012/0074712 A1 * | 3/2012 | Bursal | F03D 1/025 290/55 |
| 2012/0133140 A1 | 5/2012 | Cornelius et al. | |
| 2013/0106105 A1 * | 5/2013 | Dehlsen | F03B 17/061 290/43 |

FOREIGN PATENT DOCUMENTS

| | | |
|---|---|---|
| JP | 2001-153021 A | 6/2001 |
| JP | 2001-221141 A | 8/2001 |
| JP | 2005-506824 A | 3/2005 |
| JP | 2007-016786 A | 1/2007 |
| JP | 2007-170282 A | 7/2007 |
| JP | 2008-063961 A | 3/2008 |
| JP | 2008-63961 A | 3/2008 |
| JP | 3145233 U | 10/2008 |
| JP | 4458641 B2 | 4/2010 |
| JP | 2010-101263 A | 5/2010 |
| JP | 2010-174678 A | 8/2010 |
| JP | 2011-122508 A | 6/2011 |
| JP | 2012-092651 A | 5/2012 |
| JP | 2012-525535 A | 10/2012 |
| JP | 2012-532274 A | 12/2012 |
| WO | 81/00595 A1 | 3/1981 |
| WO | 2005/061886 A1 | 7/2005 |
| WO | 2010/125476 A1 | 11/2010 |

OTHER PUBLICATIONS

International Search Report issued in related application PCT/JP2012/075609, completed Dec. 12, 2012 and 2012. mailed Dec. 25, 2012.
International Search Report issued in corresponding application PCT/JP2012/076785, completed on Dec. 12, 2012 and mailed Dec. 25, 2012.
Written opinion by the International Searching Authority issued in corresponding application PCT/JP2012/076785, completed on Dec. 12, 2012 and mailed Dec. 25, 2012.
International Search Report issued in related application PCT/JP2013/055954, completed Jun. 3, 2013 and mailed Jun. 11, 2013.
Written opinion of the International Searching Authority issued in related application PCT/JP2013/055954, completed Jun. 3, 2013 and mailed Jun. 11, 2013.
Office Action issued in co-pending U.S. Appl. No. 14/421,185 on Mar. 8, 2016.
Extended European Search Report issued in corresponding application 12886697, completed Jan. 15, 2016 and mailed Jan. 27, 2016.
Extended European Search Report issued in related application 13876822, completed Jan. 15, 2016 and mailed Jan. 27, 2016.
Extended European Search Report issued in related application 12886092, completed Jan. 15, 2016 and mailed Jan. 27, 2016.

\* cited by examiner

SUBMERSIBLE POWER GENERATOR

This is a National Phase Application in the United States of International Patent Application No. PCT/JP2012/076785 filed Oct. 17, 2012. The entire disclosure of the above patent application is hereby incorporated by reference.

TECHNICAL FIELD

The present invention relates to a submersible power generator.

BACKGROUND ART

Patent document No. 1 discloses a submersible power generator comprising relatively rotating inner and outer rotational armatures, propellers for driving the inner and outer rotational armatures to rotate relatively to each other, and a casing for accommodating the inner and outer rotational armatures, which submersible power generator comprises a power generation mechanism provided with a pair of front and rear outer rotational armatures and a pair of front and rear inner fixed armatures, a pair of front and rear propellers rotating in directions opposite to each other to rotate the pair of front and rear outer rotational armatures in directions opposite to each other, and a casing for accommodating the pair of front and rear inner fixed armatures and shielding them from an external environment, wherein the submersible power generator is installed under water to operate in a water current, and buoyancy acting on the submersible power generator is larger than gravity acting on the submersible power generator.

PRIOR ART DOCUMENTS

Patent Documents

Patent Document No. 1: Japanese Patent Laid-Open No. 2007-016786

DISCLOSURE OF INVENTION

Problem to be Solved

In the aforementioned submersible power generator, the front outer rotational armature driven by the front propeller does not operably engage the rear outer rotational armature driven by the rear propeller, so that rotational torque impressed on the front inner fixed armature by the opposing front outer rotational armature and rotational torque impressed on the rear inner fixed armature by the opposing rear outer rotational armature are independent of each other kinetically and electromagnetically during power generation, with the result that the levels of the two rotational torques do not necessarily become equal to each other. Therefore, the aforementioned submersible power generator cannot be stably moored in water.

The electromotive voltage level of the power generation mechanism is proportional to the speed at which the rotational armature cuts a magnetic field. In the submersible power generator, increase of rotation speed of the propellers should be restrained from the viewpoint of preventing occurrence of propeller cavitation. Therefore, in the aforementioned submersible power generator, wherein a pair of sets of the outer rotational armature and the opposing inner fixed armature are disposed independent of each other, it is necessary for generating high electromotive voltage to provide a speed increasing gear or pulley mechanism for increasing the speed of the rotation of the propellers transmitted to the outer rotational armatures. Provision of a speed increasing gear or pulley mechanism increases the size of the power generator.

Therefore, an object of the present invention is to provide a submersible power generator which can be stably moored in water and can generate high electromotive voltage without being increased in size.

BRIEF SUMMARY OF THE INVENTION

In accordance with the present invention, there is provided a submersible power generator comprising relatively rotating inner and outer rotational armatures, propellers for driving the inner and outer rotational armatures to rotate relatively to each other, and a casing for accommodating the inner and outer rotational armatures, which submersible power generator comprises an inner/outer double rotational armatures-type power generation mechanism provided with an outer rotational armature and an inner rotational armature opposing the outer rotational armature to rotate in a direction opposite to a direction of rotation of the outer rotational armature, and a pair of propellers disposed coaxially with blades of one of the pair of propellers and blades of the other of the pair of propellers twisted in opposite directions relative to an extending direction of a central axis of the pair of propellers, wherein one of the propellers is connected to one of the inner and outer rotational armatures and the other of the propellers is connected to the other of the inner and outer rotational armatures, and further comprises a casing for accommodating the inner/outer double rotational armatures-type power generation mechanism and shielding it from an external environment, and which submersible power generator, as installed under water to operate in a water current, is made to have buoyancy F acting thereon which is larger than gravity W acting thereon during operation of the submersible power generator (when the submersible power generator is moored by a mooring wire, F>W+ gravity acting on the mooring wire−buoyancy acting on the mooring wire).

In the submersible power generator in accordance with the present invention, reciprocal rotational torques acting on the inner/outer double rotational armatures during power generation become equal to each other kinetically and electromagnetically according to the third law of motion (action-reaction law), so that reciprocal rotational torques acting on an inner rotary system formed by the inner rotational armature and the propeller connected to the inner rotational armature and an outer rotary system formed by the outer rotational armature and the propeller connected to the outer rotational armature become equal and cancel each other. As a result, no reactionary rotational torque is impressed on the casing. Therefore, the submersible power generator in accordance with the present invention can be stably moored in water without incurring rotation of the casing around the central axis of the propellers, irrespective of power generation amount and water current speed.

In the submersible power generator in accordance with the present invention, the pair of propellers, which are disposed coaxially with blades of one of the pair of propellers and blades of the other of the pair of propellers twisted in opposite directions relative to an extending direction of a central axis of the pair of propellers, rotate in opposite directions to rotate the inner/outer rotational armatures in directions opposite to each other. Therefore, relative rotation speed between the inner/outer rotational armatures can be increased, with increase of rotation speed of the propellers restricted, so as to increase the speed at which the inner/outer rotational armatures cut a magnetic field. As a result, electromotive voltage higher than that obtained by the conventional submersible power generator can be obtained without causing an increase in size due to provision of a speed increasing gear or pulley mechanism. On the other hand, when electromotive voltage is set at the same level as that of the conventional submersible power generator, the number of windings of the armatures can be decreased, a permanent magnet forming the armature of a synchronous generator can be downsized, and the rotation radius of the armature can be decreased, so that the submersible power generator in accordance with the present invention can be made smaller than the conventional submersible power generator because the speed at which the inner/outer rotational armatures of the submersible power generator of the present invention cut a magnetic field is higher than the speed at which the rotational armatures of the conventional submersible power generator cut a magnetic field.

Buoyancy F acting on the submersible power generator is larger than gravity W acting thereon during operation of the submersible power generator (when the submersible power generator is moored by a mooring wire, F>W+gravity acting on the mooring wire–buoyancy acting on the mooring wire). Therefore, the submersible power generator in accordance with the present invention can be easily and stably moored by a mooring wire, etc., without being provided with an additional float member.

In accordance with a preferred aspect of the present invention, polar moment of inertia of one of the pair of propellers is set at a level lower than polar moment of inertia of the other of the pair of propellers.

When polar moment of inertia of one of the pair of propellers is set at a level lower than polar moment of inertia of the other of the pair of propellers, start of said one of the pair of propellers in a water current can be advanced so as to advance start of the power generator.

In accordance with a preferred aspect of the present invention, as seen on a meridian plane (a vertical plane including a rotational axis of the propellers), a rotational moment center, around which a sum total of rotational moments generated by the buoyancy F acting on the submersible power generator, the gravity W acting on the submersible power generator and drag D acting on the submersible power generator in a water current becomes zero, comes to be located on the casing.

When a rotational moment center assumes a location on the casing as seen on a meridian plane, the submersible power generator can be stably held in water by some means on an axis passing through the rotational moment center and crossing the meridian plane at right angles.

In accordance with a preferred aspect of the present invention, the rotational moment center is located on an action line of the drag D acting on the submersible power generator, and the submersible power generator is supported rotatably around an axis passing through the rotational moment center and crossing the meridian plane at right angles.

The aforementioned manner of support makes it possible to horizontally hold the submersible power generator irrespective of water current speed.

In accordance with the present invention, there is provided a submersible power generation system comprising the aforementioned submersible power generator as moored in a water current by a mooring wire connected to the casing rotatably around an axis passing through the rotational moment center and crossing the meridian plane at right angles.

In a submersible power generation system in accordance with the present invention, the submersible power generator can be stably held also as seen on the meridian plane irrespective of power generation amount and water current speed because the submersible power generator is moored in a water current by a mooring wire connected to the casing rotatably around an axis passing through the rotational moment center and crossing the meridian plane at right angles.

In accordance with a preferred aspect of the present invention, one or more mooring wires are connected to the casing symmetrically bilaterally relative to the action line of the drag D as seen along the extending direction of the action line of the drag D.

The aforementioned manner of support makes it possible to prevent yawing of the submersible power generator caused by the drag D and stably hold the submersible power generator in water.

In accordance with a preferred aspect of the present invention, a fork-shaped arm member is connected to the casing rotatably around an axis passing through the rotational moment center and crossing the meridian plane at right angles, and a mooring wire is connected to the arm member rotatably or pivotably relative to the arm member.

When a fork-shaped arm member is connected to the casing rotatably around an axis passing through the rotational moment center and crossing the meridian plane at right angles, and a mooring wire is connected to the arm member rotatably or pivotably relative to the arm member, it becomes possible to stably hold the power generator in water even by a single mooring wire.

In accordance with a preferred aspect of the present invention, one or more mooring wires are connected to the casing symmetrically bilaterally relative to the action line of the drag D as seen along the extending direction of the action line of the drag D.

The aforesaid manner of support makes it possible to prevent yawing of the submersible power generator caused by the drag D and stably hold the submersible power generator in water.

In accordance with a preferred aspect of the present invention, the casing is provided with a stopper for restricting swing motion of a free end of the fork-shaped member toward the propellers.

When the casing is provided with a stopper for restricting swing motion of a free end of the fork-shaped member toward the propellers, the one or more mooring wires attached to the free end of the fork-shaped member are prevented from interfering with the propellers.

In accordance with a preferred aspect of the present invention, an action line of the buoyancy F acting on the submersible power generator becomes located upstream of an action line of the gravity W acting on the submersible power generator.

When the action line of the buoyancy F is located upstream of the action line of the gravity W, the rotational moment center becomes located upstream of the action line of the buoyancy F, so that the mooring wire or the mooring wires are distanced from the propellers and interference of the mooring wire or the mooring wires with the propellers is more effectively prevented.

In accordance with the present invention, there is provided a submersible power generation system comprising the aforementioned submersible power generator as supported on an axis passing through the rotational moment center and crossing the meridian plane at right angles by a support fixed to a seabed or a riverbed and extending upward.

In accordance with the present invention, there is provided a submersible power generation system comprising the aforementioned submersible power generator as supported on an axis passing through the rotational moment center and crossing the meridian plane at right angles by a support extending downward from a float on a water surface.

In the aforementioned submersible power generation system, no force is impressed on the support from the submersible power generator other than an upward force owing to difference between the buoyancy F and the gravity W of the submersible power generator and the drag crossing the upward force at right angles, so that a coupling portion between the support and the submersible power generator becomes simple in structure.

DETAILED DESCRIPTION OF THE INVENTION

A submersible power generator and a submersible power generation system in accordance with preferred embodiments of the present invention will be described.

Figure 1:
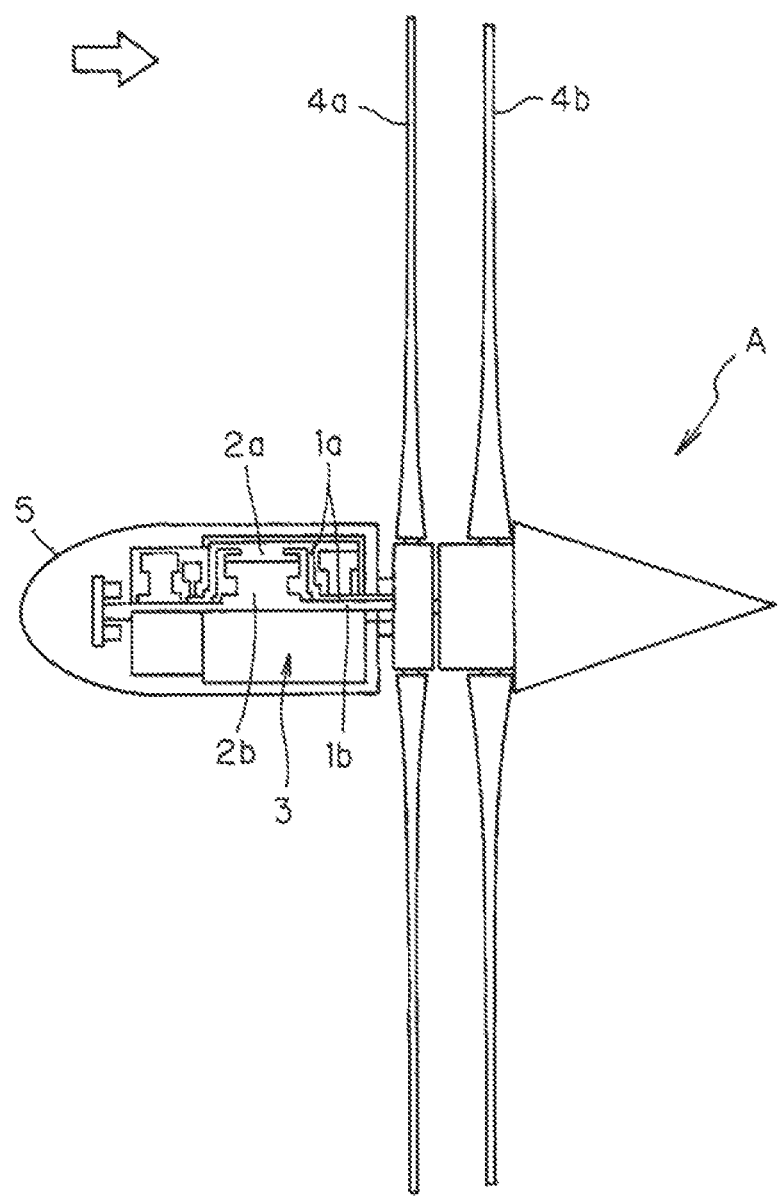
FIG. 1 is a side sectional view of a submersible power generator in accordance with a preferred embodiment of the present invention.

As shown in FIG. 1, a submersible power generator A comprises an inner/outer double rotational armatures-type power generation mechanism 3 provided with a cylindrical outer shaft 1$a$, an inner shaft 1$b$ coaxially passing through the outer shaft 1$a$, an outer rotational armature 2$a$ fixed to the outer shaft 1$a$ and an inner rotational armature 2$b$ fixed to the inner shaft 1$b$ and opposing the outer rotational armature 2$a$, a front propeller 4$a$ fixed to the outer shaft 1$a$ so as to rotate the outer shaft 1$a$ and the outer rotational armature 2$a$, a rear propeller 4$b$ located rearward of the front propeller 4$a$ relative to a direction of water current indicated by a blank arrow in FIG. 1, disposed coaxially and in alignment with the front propeller 4$a$, and fixed to the inner shaft 1$b$ so as to rotate the inner shaft 1$b$ and the inner rotational armature 2$b$, and a bombshell shaped casing 5 for accommodating the inner/outer double rotational armatures-type power generation mechanism 3 and shielding it from an external environment. A twisting direction of blades of the front propeller 4$a$ and a twisting direction of blades of the rear propeller 4$b$ relative to an extending direction of a central axis of the propellers 4$a$ and 4$b$ are opposite to each other. A polar moment of inertia of the rear propeller 4$b$ is set at a level lower than a polar moment of inertia of the front propeller 4$a$.

Figure 2:
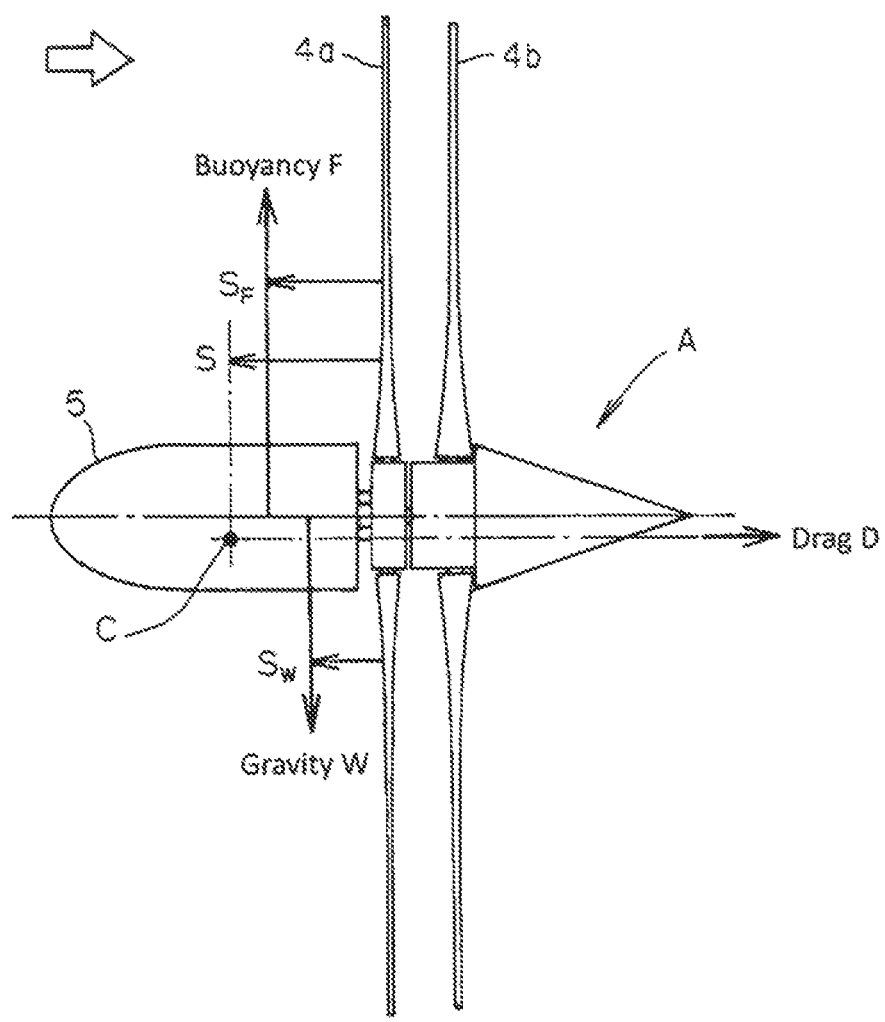
FIG. 2 is a side view of a submersible power generator in accordance with a preferred embodiment of the present invention showing a rotational moment center, around which a sum total of rotational moments generated by the buoyancy F acting on the submersible power generator, the gravity W acting on the submersible power generator and drag D acting on the submersible power generator in a water current becomes zero.

Shape, size and weight of the structural members of the submersible power generator A are designed so that a formula F>W (when the submersible power generator is moored by a mooring wire, F>W+gravity acting on the mooring wire−buoyancy acting on the mooring wire) is established, wherein F is buoyancy acting on the submersible power generator A when the submersible power generator A is located in a water current as indicated by a blank arrow in FIG. 2, W is gravity acting on the submersible power generator A, and D is drag acting on the submersible power generator A. Further, the shape, size and weight of the structural members of the submersible power generator A are designed so that, as seen on a meridian plane (a vertical plane including a rotational axis of the propellers), a rotational moment center, around which a sum total of rotational moments generated by the buoyancy F acting on the submersible power generator and directed vertically upward, the gravity W acting on the submersible power generator and directed vertically downward and drag D acting on the submersible power generator and directed in parallel with the water current becomes zero, comes to be located on the casing 5. When the aforementioned forces F, W and D are indicated by vectors (action lines) passing through working points as shown in FIG. 2, distances between a center of the front propeller 4$a$ to the vectors F and W are indicated by $S_F$ and $S_W$, and a rotational moment center is located on the action line of the drag D, and a distance S from the center of the front propeller 4$a$ to the rotational moment center C measured in an extending direction of the central axis of the propeller 4$a$ is indicated by a formula:

$$S=(F \cdot S_F - W \cdot S_W)/(F-W)$$

The location of the rotational moment center C does not move even as seen on a plane parallel to the meridian plane.

Figure 3:
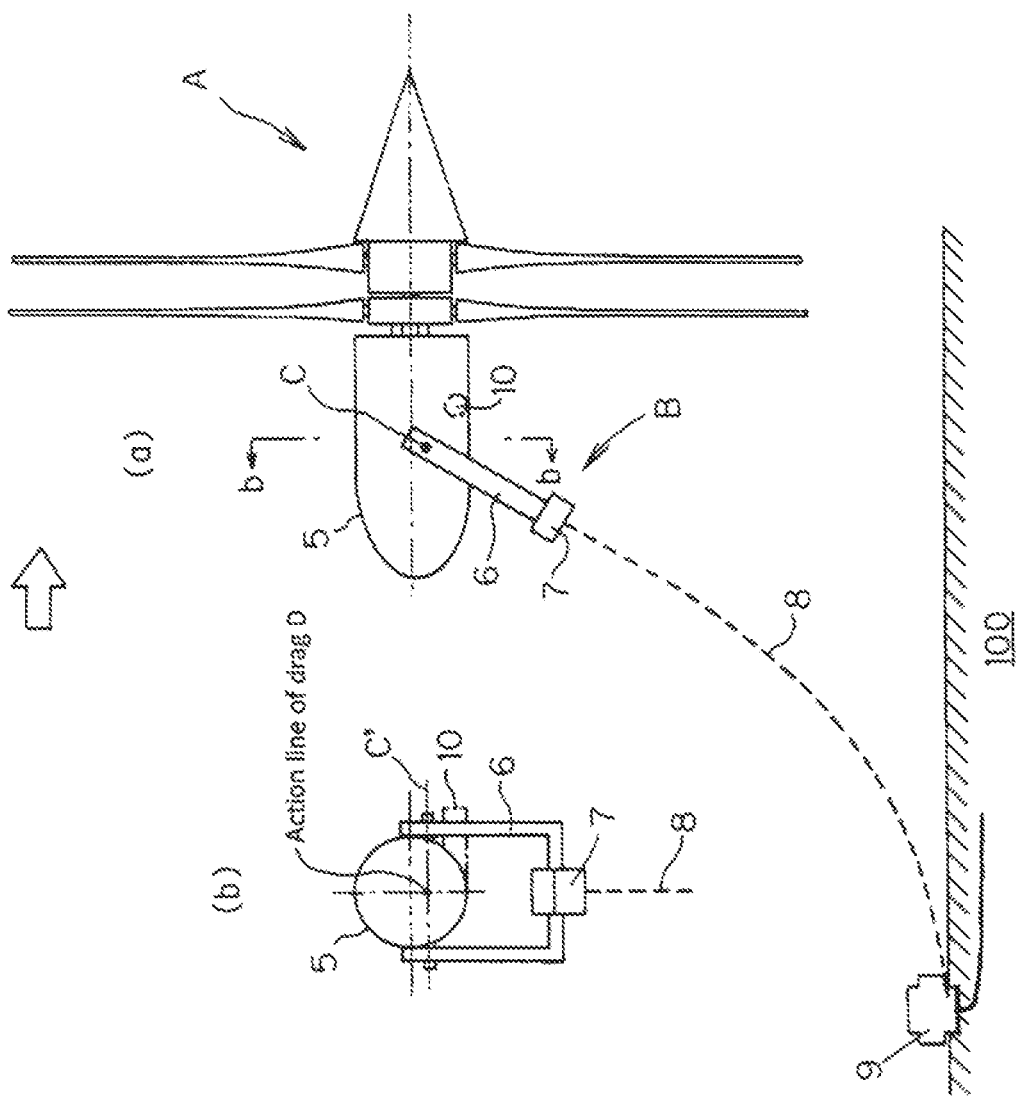
FIG. 3 is a side view of a submersible power generation system comprising a submersible power generator in accordance with a preferred embodiment of the present invention.

As shown in FIG. 3, the casing 5 of the submersible power generator A is connected to a fork-shaped arm member 6 of a bilaterally symmetrical shape as seen along the central axis of the propellers at opposite side portions. The fork-shaped member 6 is connected to the casing 5 rotatably around an axis C' passing through the rotational moment center C and crossing the meridian plane at right angles. As can be seen from FIG. 3($b$), one end of a mooring wire 8 is connected to a free end of the fork-shaped member 6 through a slip ring 7 rotatably relative to the fork-shaped member 6 and symmetrically bilaterally relative to the action line of the drag D as seen in the extending direction of the action line of the drag D, and the other end of the mooring wire 8 is connected to an anchor 9 such as a tetrapod or the like installed in a seabed or riverbed 100. Thus, the submersible power generator A is horizontally moored in a water current with the propellers 4$a$ and 4$b$ automatically directed to the downstream side of the water current indicated by a blank arrow in FIG. 3 and accordingly the bombshell head shaped end portion of the casing 5 distanced from the propellers 4$a$ and 4$b$ directed to the upstream side of the water current. The submersible power generator A and aforementioned mooring members form a submersible power generation system B.

The mooring wire 8 of the submersible power generation system B forms a catenary as seen on the meridian plane, which is determined by the aforementioned buoyancy F, gravity G, drag D, buoyancy acting on the mooring wire 8, and gravity acting on the mooring wire 8. Curvature of the catenary becomes smaller as water current speed becomes slower. When water current speed becomes zero, the mooring wire 8 extends vertically from the anchor 9. Therefore, the mooring wire 8 does not interfere with the propellers 4a and 4b irrespective of fluctuation of the speed and direction of the water current.

Operations of the submersible power generator A and the submersible power generation system B will be described.

As the twisting directions of the blades of the front and rear propellers 4a and 4b relative to the extending direction of the central axis of the propellers 4a and 4b are opposite to each other, the front and rear propellers 4a and 4b rotate in opposite directions in the water current as indicated by a blank arrow in FIG. 3. The propellers 4a and 4b drive the outer/inner rotational armatures 2a and 2b through outer/inner shafts 1a and 1b to rotate them in directions opposite to each other, thereby generating electric power. Generated electric power is taken out of the power generator through the arm member 6, the slip ring 7, the mooring wire 8 and a cable integrally united with the mooring wire 8, and supplied to land electric equipment through cables laid over the bottom of the water body or supplied to electric equipment on the water through cables elevated above the water.

In the submersible power generator A, reciprocal rotational torques acting on the inner/outer double rotational armatures 2a and 2b during power generation become equal to each other, and reciprocal rotational torques acting on an inner rotary system formed by the inner rotational armature 2b, the inner shaft 1b and the rear propeller 4b connected to the inner rotational armature 2b and an outer rotary system formed by the outer rotational armature 2a, the outer shaft 1a and the front propeller 4a connected to the outer rotational armature 2a become equal to each other kinetically and electromagnetically in accordance with the third law of motion so as to cancel each other. As a result, no reactionary rotational torque is impressed on the casing 5. Therefore, the submersible power generator A can be stably moored in water without incurring rotation of the casing 5 around the central axis of propellers irrespective of fluctuation of power generation amount and water current speed.

In the submersible power generator A, the power generation mechanism 3 comprises the outer rotational armature 2a and the inner rotational armature 2b rotating in the direction opposite to the rotational direction of the outer rotational armature 2a, and the pair of front/rear double propellers 4a and 4b rotating in directions opposite to each other rotate the inner/outer rotational armatures 2a and 2b opposing each other in directions opposite to each other. Therefore, relative rotation speed between the inner/outer rotational armatures 2a and 2b can be increased so as to increase the speed at which the inner/outer rotational armatures cut a magnetic field, while restraining increase of rotation speeds of the propellers 4a and 4b. As a result, electromotive voltage higher than that obtained by the conventional submersible power generator can be obtained without increase of size due to provision of a speed increasing gear or pulley mechanism. On the other hand, when electromotive voltage is set at the same level as that of the conventional submersible power generator, the number of windings of the armatures 2a and 2b can be decreased, a permanent magnet forming the armature of a synchronous generator can be downsized, and rotation radius of the armature can be decreased, so that the submersible power generator A can be made smaller than the conventional submersible power generator because the speed at which the inner/outer rotational armatures 2a and 2b cut a magnetic field is larger than the speed at which the rotational armatures of the conventional submersible power generator cut a magnetic field.

The buoyancy F acting on the submersible power generator A is larger than the gravity W acting on the submersible power generator A during operation of the submersible power generator A (when the submersible power generator A is moored by a mooring wire, F>W+gravity acting on the mooring wire−buoyancy acting on the mooring wire). Therefore, the submersible power generator A can be easily and stably held in the water without being provided with an additional float member.

Polar moment of inertia of the rear propeller 4b is set at a level lower than polar moment of inertia of the front propeller 4a, so that start of the rear propeller 4b in a water current is advanced so as to advance start of the power generator A.

In the submersible power generator A, as seen on the meridian plane, the rotational moment center, around which the sum total of rotational moments generated by the buoyancy F acting on the submersible power generator A, the gravity W acting on the submersible power generator A and drag D acting on the submersible power generator A in a water current becomes zero, comes to be located on the casing 5. Therefore, the submersible power generator A can be stably held in water also on the meridian plane by some means on an axis passing through the rotational moment center and crossing the meridian plane at right angles.

In the submersible power generation system B, the rotational moment center is located on the action line of the drag D, and the casing 5 is supported at both sides rotatably around an axis C' passing through the rotational moment center C and crossing the meridian plane at right angles. The aforementioned manner of support makes it possible to horizontally hold the submersible power generator A irrespective of water current speed.

In the submersible power generation system B, the submersible power generator A can be stably held irrespective of power generation amount and water current speed because the submersible power generator A is moored in water by the mooring wire 8 connected to the casing 5 rotatably around the axis C' passing through the rotational moment center C and crossing the meridian plane at right angles. The wire 8 is connected to the casing 5 symmetrically bilaterally relative to the action line of the drag D as seen along the extending direction of the action line of the drag D. The aforesaid manner of support makes it possible to prevent yawing of the submersible power generator A caused by the drag D and stably hold the submersible power generator A in water.

In the submersible power generation system B, the fork-shaped arm member 6 is connected to the casing 5 rotatably around the axis C' passing through the rotational moment center C and crossing the meridian plane at right angles, and the mooring wire 8 is connected to the arm member 6 through a slip ring 7 capable of rotation relative to the arm member 6 and symmetrically bilaterally relative to the action line of the drag D as seen along the extending direction of the action line of the drag D. The aforementioned manner of support makes it possible to stably hold the submersible power generator A in water by a single mooring wire 8 irrespective of power generation amount and water current speed.

The present invention is not restricted to the aforementioned preferred embodiment.

The submersible power generator A can be moored in water by a pair of mooring wires 8 connected to the opposite side portions of the casing 5 rotatably around the axis C' passing through the rotational moment center C and crossing the meridian plane at right angles and symmetrically bilaterally relative to the action line of the drag D as seen along the extending direction of the action line of the drag D.

The mooring wire 8 can be connected to the arm member 6 pivotably through a universal joint.

A plurality of mooring wires 8 can be connected to the arm member 6. In this case, the mooring wires 8 are desirably connected to the arm member 6 symmetrically bilaterally relative to the action line of the drag D as seen along the extending direction of the action line of the drag D.

As indicated by dashed-dotted lines in FIG. 3, the casing 5 can be provided with a stopper 10 for restricting swing motion of a free end of the fork-shaped arm member 6 toward the propellers 4a and 4b.

When the swing motion of a free end of the fork-shaped arm member 6 toward the propellers 4a and 4b is restricted within an appropriate range, the mooring wire 8 attached to the free end of the fork-shaped arm member 6 is easily prevented from interfering with the propellers 4a and 4b.

When the action line of the buoyancy F is located upstream of the action line of the gravity W as shown in FIG. 2, the rotational moment center C becomes located upstream of the action line of the buoyancy F, so that the mooring wire 8 is distanced from the propellers 4a and 4b and interference of the mooring wire 8 with the propellers 4a and 4b is effectively prevented irrespective of water current speed.

Figure 4:
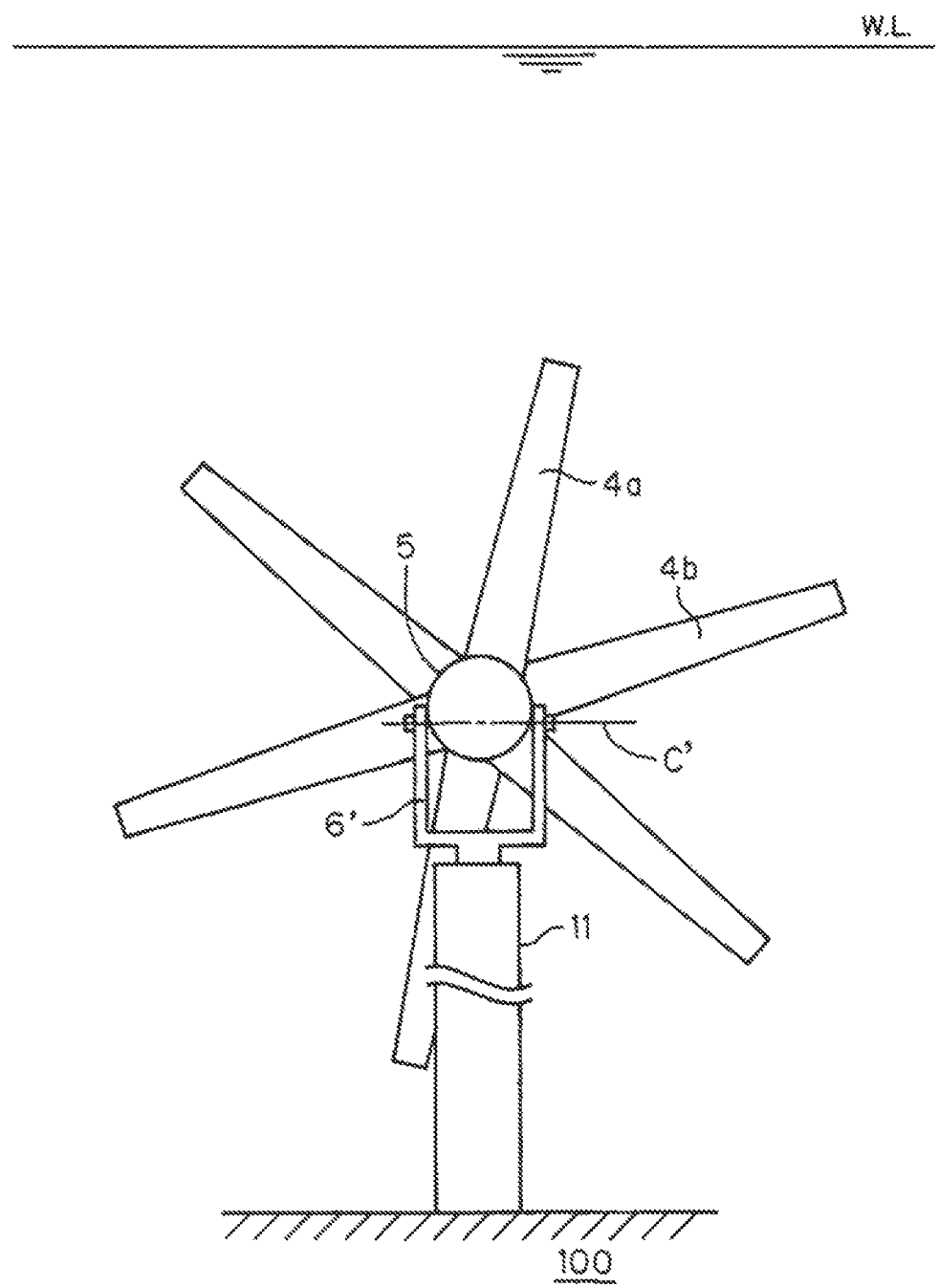
FIG. 4 is a front view of a variation of the submersible power generation system comprising a submersible power generator in accordance with a preferred embodiment of the present invention.
Figure 5:
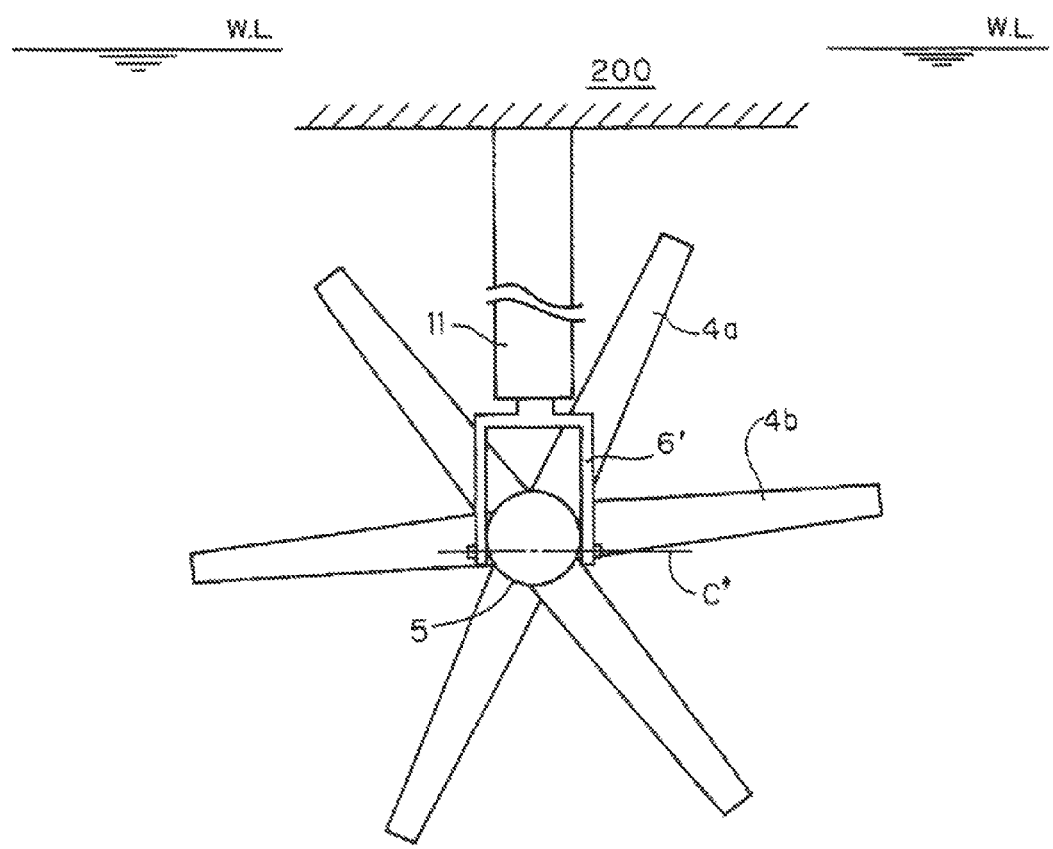
FIG. 5 is a front view of another variation of the submersible power generation system comprising a submersible power generator in accordance with a preferred embodiment of the present invention.

It is possible as shown in FIG. 4 to connect the fork-shaped arm member 6' to the casing 5 rotatably around the axis C' passing through the rotational moment center C and crossing the meridian plane at right angles, and support a base portion of the arm member 6' rotably around a vertical axis by a support 11 fixed to a seabed or a riverbed 100 and extending upward. It is possible as shown in FIG. 5 to connect the fork-shaped arm member 6' to the casing 5 rotatably around the axis C' passing through the rotational moment center C and crossing the meridian plane at right angles, and support a base portion of the arm member 6' rotably around a vertical axis by a support 11 extending downward from a float 200 on the water surface. In the aforementioned submersible power generation systems, no force is impressed on the support 11 from the submersible power generator A other than an upward force owing to difference between the buoyancy F and the gravity W of the submersible power generator A and the drag D crossing the difference upward force at right angles, so that the structure of a coupling portion between the support 11 and the submersible power generator A becomes simple. The float 200 can be easily moored.

When the base portion of the arm member 6' is supported rotatably around a vertical axis, the submersible power generator A can be laid along the water current.

When the support 11 is made telescopic, the submersible power generator A can be located at an optimum water depth position.

INDUSTRIAL APPLICABILITY

The present invention can be widely used for submersible power generators and submersible power generation systems irrespective of whether offshore installation type or river installation type.

BRIEF DESCRIPTION OF THE REFERENCE NUMERALS

A Submersible power generator
B Submersible power generation system
1a Outer shaft
1b Inner shaft
2a Outer rotational armature
2b Inner rotational armature
3 Power generation mechanism
4a Front propeller
4b Rear propeller
5 Casing
6, 6' Arm member
7 Slip ring
8 Mooring wire
9 Anchor
10 Stopper
11 Support
100 Seabed or riverbed
200 Float

The invention claimed is:

1. A submersible power generator comprising:
an inner/outer double rotational armatures-type power generation mechanism provided with an outer rotational armature and an inner rotational armature opposing the outer rotational armature to rotate in a direction opposite to a direction of rotation of the outer rotational armature,
a pair of propellers disposed coaxially with blades of one of the pair of propellers and blades of the other of the pair of propellers twisted in opposite directions relative to an extending direction of a central axis of the pair of propellers, wherein one of the propellers is connected to one of the inner and outer rotational armatures and the other of the propellers is connected to the other of the inner and outer rotational armatures, and
a casing for accommodating the inner/outer double rotational armatures-type power generation mechanism and shielding the armatures-type power generation mechanism from an external environment,
wherein the submersible power generator, as installed under water to operate in a water current, has a buoyancy F acting thereon that is larger than a gravity W acting thereon during operation of the submersible power generator,
wherein, as seen on a meridian plane, a rotational moment center, around which a sum total of rotational moments generated by buoyancy F acting on the submersible power generator, gravity W acting on the submersible power generator and drag D acting on the submersible power generator in a water current becomes zero, comes to be located on the casing, and wherein the meridian plane is a vertical plane including a rotational axis of the propellers.

2. The submersible power generator of claim 1, wherein polar moment of inertia of one of the pair of propellers is set at a level lower than polar moment of inertia of the other of the pair of propellers.

3. The submersible power generator of claim 1, wherein the rotational moment center is located on an action line of the drag D acting on the submersible power generator, and the submersible power generator is supported rotatably around an axis passing through the rotational moment center and crossing the meridian plane at right angles.

4. A submersible power generation system, comprising:
the submersible power generator of claim 3, as moored in water by a mooring wire connected to the casing rotatably around an axis passing through the rotational moment center and crossing the meridian plane at right angles, and
wherein F>W+gravity acting on the mooring wire−buoyancy acting on the mooring wire.

5. The submersible power generation system of claim 4, wherein a fork-shaped arm member is connected to the casing rotatably around an axis passing through the rotational moment center and crossing the meridian plane at right angles, and the mooring wire is connected to the arm member rotatably or pivotably relative to the arm member.

6. The submersible power generation system of claim 5, wherein one or more mooring wires are connected to the arm member symmetrically bilaterally relative to the action line of the drag D as seen along the extending direction of the action line of the drag D.

7. The submersible power generation system of claim 4, wherein an action line of the buoyancy F acting on the submersible power generator becomes located upstream of an action line of the gravity W acting on the submersible power generator.

8. The submersible power generation system, comprising:
the submersible power generator of claim 3, as supported on an axis passing through the rotational moment center and crossing the meridian plane at right angles by a support fixed to a seabed or a riverbed and extending upward.

9. The submersible power generation system, comprising:
the submersible power generator of claim 3, as supported on an axis passing through the rotational moment center and crossing the meridian plane at right angles by a support extending downward from a float on a water surface.

10. A submersible power generation system, comprising:
the submersible power generator of claim 1, as moored in water by a mooring wire connected to the casing rotatably around an axis passing through the rotational moment center and crossing the meridian plane at right angles, and wherein F>W+gravity acting on the mooring wire−buoyancy acting on the mooring wire.

11. The submersible power generation system of claim 10, wherein one or more mooring wires are connected to the casing symmetrically bilaterally relative to the action line of the drag D as seen along the extending direction of the action line of the drag D.

12. The submersible power generation system of claim 10, wherein a fork-shaped arm member is connected to the casing rotatably around an axis passing through the rotational moment center and crossing the meridian plane at right angles, and the mooring wire is connected to the arm member rotatably or pivotably relative to the arm member.

13. The submersible power generation system of claim 12, wherein one or more mooring wires are connected to the arm member symmetrically bilaterally relative to the action line of the drag D as seen along the extending direction of the action line of the drag D.

14. The submersible power generation system of claim 10, wherein an action line of the buoyancy F acting on the submersible power generator becomes located upstream of an action line of the gravity W acting on the submersible power generator.

15. The submersible power generation system, comprising the submersible power generator of claim 1 as supported on an axis passing through the rotational moment center and crossing the meridian plane at right angles by a support fixed to a seabed or a riverbed and extending upward.

16. The submersible power generation system, comprising the submersible power generator of claim 1 as supported on an axis passing through the rotational moment center and crossing the meridian plane at right angles by a support extending downward from a float on a water surface.

17. A submersible power generation system, comprising:
a submersible power generator comprising an inner/outer double rotational armatures-type power generation mechanism provided with an outer rotational armature and an inner rotational armature opposing the outer rotational armature to rotate in a direction opposite to a direction of rotation of the outer rotational armature, a pair of propellers disposed coaxially with blades of one of the pair of propellers and blades of the other of the pair of propellers twisted in opposite directions relative to an extending direction of a central axis of the pair of propellers, wherein one of the propellers is connected to one of the inner and outer rotational armatures and the other of the propellers is connected to the other of the inner and outer rotational armatures, and a casing for accommodating the inner/outer double rotational armatures-type power generation mechanism and shielding the armatures-type power generation mechanism from an external environment,
wherein the submersible power generator, as installed under water to operate in a water current, has a buoyancy F acting thereon that is larger than a gravity W acting thereon during operation of the submersible power generator,
wherein, as seen on a meridian plane, a rotational moment center, around which a sum total of rotational moments generated by buoyancy F acting on the submersible power generator, gravity W acting on the submersible power generator and drag D acting on the submersible power generator in a water current becomes zero, comes to be located on the casing, and wherein the meridian plane is a vertical plane including a rotational axis of the propellers
wherein a fork-shaped arm member is connected to the casing rotatably around an axis passing through the rotational moment center and crossing the meridian plane at right angles, and the mooring wire is connected to the arm member rotatably or pivotably relative to the arm member,
wherein the casing is provided with a stopper for restricting swing motion of a free end of the fork-shaped arm member toward the propellers, and
wherein the submersible power generator is moored in water by a mooring wire connected to the casing rotatably around an axis passing through the rotational moment center and crossing the meridian plane at right angles, and wherein F>W+gravity acting on the mooring wire−buoyancy acting on the mooring wire.

18. A submersible power generation system, comprising:
a submersible power generator comprising an inner/outer double rotational armatures-type power generation mechanism provided with an outer rotational armature and an inner rotational armature opposing the outer rotational armature to rotate in a direction opposite to a direction of rotation of the outer rotational armature, a pair of propellers disposed coaxially with blades of one of the pair of propellers and blades of the other of the pair of propellers twisted in opposite directions relative to an extending direction of a central axis of the pair of propellers, wherein one of the propellers is connected to one of the inner and outer rotational armatures and the other of the propellers is connected to the other of the inner and outer rotational armatures, and a casing for accommodating the inner/outer double rotational armatures-type power generation mechanism and shielding the armatures-type power generation mechanism from an external environment, wherein, as seen on a meridian plane, a rotational moment center, around which a sum total of rotational moments generated by buoyancy F acting on the submersible power generator, gravity W acting on the submersible power generator and drag D acting on the submersible power generator in a water current becomes zero, comes to be located on the casing, and wherein the meridian plane is a vertical plane including a rotational axis of the propellers, wherein the submersible power generator, as installed under water to operate in a water current, has a buoyancy F acting thereon that is larger than a gravity W acting thereon during operation of the submersible power generator, wherein the rotational moment center is located on an action line of the drag D acting on the submersible power generator, and the submersible power generator is supported rotatably around an axis passing through the rotational moment center and crossing the meridian plane at right angles, wherein a fork-shaped arm member is connected to the casing rotatably around an axis passing through the rotational moment center and crossing the meridian plane at right angles, and the mooring wire is connected to the arm member rotatably or pivotably relative to the arm member, wherein the casing is provided with a stopper for restricting swing motion of a free end of the fork-shaped arm member toward the propellers, wherein the submersible power generator is moored in water by a mooring wire connected to the casing rotatably around an axis passing through the rotational moment center and crossing the meridian plane at right angles, and and wherein F>W+gravity acting on the mooring wire−buoyancy acting on the mooring wire.

* * * * *